United States Patent
Cho

(10) Patent No.: US 10,448,037 B2
(45) Date of Patent: Oct. 15, 2019

(54) DECODING APPARATUS AND METHOD FOR DISCRETE WAVELET TRANSFORM WITH BUFFER MANAGEMENT

(71) Applicant: SAMSUNG ELECTRONICS CO., LTD., Suwon-si (KR)

(72) Inventor: Yong-rae Cho, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 108 days.

(21) Appl. No.: 15/297,823

(22) Filed: Oct. 19, 2016

(65) Prior Publication Data

US 2017/0118481 A1   Apr. 27, 2017

(30) Foreign Application Priority Data

Oct. 21, 2015   (KR) .................. 10-2015-0146394

(51) Int. Cl.
| | | |
|---|---|---|
| H04N 7/12 | (2006.01) | |
| H04N 19/44 | (2014.01) | |
| H04N 19/136 | (2014.01) | |
| H04N 19/423 | (2014.01) | |
| H04N 19/60 | (2014.01) | |

(52) U.S. Cl.
CPC .......... *H04N 19/44* (2014.11); *H04N 19/136* (2014.11); *H04N 19/423* (2014.11); *H04N 19/60* (2014.11)

(58) Field of Classification Search
CPC .............................. H04N 19/44; H04N 19/423
USPC ..................................................... 375/240.08
See application file for complete search history.

(56) References Cited

U.S. PATENT DOCUMENTS

| | | | |
|---|---|---|---|
| 2004/0034675 A1* | 2/2004 | Chen ................. | G06F 17/148 708/400 |
| 2006/0284891 A1 | 12/2006 | Kirenko et al. | |
| 2008/0298471 A1 | 12/2008 | Fukuhara et al. | |
| 2010/0142837 A1* | 6/2010 | Fukuhara ............ | H04N 19/63 382/233 |

FOREIGN PATENT DOCUMENTS

| | | |
|---|---|---|
| JP | 2008-288834 A | 11/2008 |
| JP | 2015-18373 A | 1/2015 |
| KR | 10-0367727 B1 | 1/2003 |
| KR | 10-2006-0121851 A | 11/2006 |
| KR | 10-2010-0023123 A | 3/2010 |

(Continued)

*Primary Examiner* — Richard T Torrente
(74) *Attorney, Agent, or Firm* — Sughrue Mion, PLLC

(57) ABSTRACT

A decoding apparatus is provided. The decoding apparatus includes a conversion module configured to convert input image data by lines to perform two-dimensional conversion by generating first data corresponding to a first line and generating second data corresponding to a second line that follows the first line, a buffer configured to, in response to the first data being generated in the conversion module, receive and store the first data, and a discrete wavelet transform (DWT) module configured to receive the first data from the buffer, receive the second data from the conversion module, and perform DWT based on the first data and the second data. The buffer is further configured to, in response to receiving the second data from the conversion module, delete the first data and store the second data, thus reducing a size of a chip, reducing costs, and improving speed of calculation processing.

18 Claims, 10 Drawing Sheets

(56) References Cited

FOREIGN PATENT DOCUMENTS

| KR | 10-2011-0037051 A | 4/2011 |
| KR | 10-1303647 B1 | 9/2013 |
| KR | 10-1348931 B1 | 1/2014 |

* cited by examiner

DECODING APPARATUS AND METHOD FOR DISCRETE WAVELET TRANSFORM WITH BUFFER MANAGEMENT

CROSS-REFERENCE TO RELATED APPLICATIONS

This application claims priority from Korean Patent Application No. 10-2015-0146394, filed in the Korean Intellectual Property Office on Oct. 21, 2015, the disclosure of which is incorporated herein by reference in its entirety.

BACKGROUND OF THE INVENTION

1. Field

Apparatuses and methods consistent with the exemplary embodiments relate to a decoding apparatus, an electronic apparatus, and a controlling method thereof, and more particularly, to a decoding apparatus using two-dimensional conversion and discrete wavelet transform (DWT), an electronic apparatus and a controlling method thereof.

2. Description of the Related Art

Currently, various codecs use a similar method of converting image information in a spatial domain into that in a frequency domain through two-dimensional conversion. Such method commonly places a higher priority in a low-frequency area of the data that is sensitive to human eyes in order to reduce the amount of data corresponding to a high-frequency area when compressing information of an image.

Meanwhile, owing to the advancement in imaging and storing technology, the size of source image files greatly increased over the years, but a pixel value of a minimum size of a block used in the conventional encoding method changed little.

The Audio Video Standard (AVS) 2.0 has introduced discrete wavelet transform (DWT) to the existing scheme to expand an output of two-dimensional conversion from N×N to 2N×2N.

Although the quality of output is degraded compared with the N×N block method, the amount of data is reduced to about ¼. If the conventional method is applied to a large-sized image and to areas with fewer variations, the degraded quality may be restored to the extent that it cannot be recognized by human eyes by adding a small amount of data.

To apply DWT to data to which two-dimensional conversion is performed, separate buffers are required for storing an output of two-dimensional conversion and for storing an output of DWT.

The larger buffer requirements may mean wasted resources and increased cost.

SUMMARY

One or more exemplary embodiments provide a decoding apparatus having a small-sized buffer, an electronic apparatus, and a controlling method thereof.

According to an aspect of an exemplary embodiment, there is provided a decoding apparatus, including: a conversion module configured to convert input image data by lines to perform two-dimensional conversion by generating first data corresponding to a first line and generating second data corresponding to a second line that follows the first line; a buffer configured to, in response to the first data being generated in the conversion module, receive and store the first data corresponding to the first line; and a discrete wavelet transform (DWT) module configured to, in response to the second data being generated in the conversion module, receive, from the buffer, the first data corresponding to the first line, receive, from the conversion module, the second data corresponding to the second line, and perform DWT based on the first data and the second data. The buffer may be further configured to, in response to receiving the second data from the conversion module, delete the first data and store the second data.

The DWT module may be configured to perform DWT with respect to the first data corresponding to the first line to generate first output data while the buffer may store the first data corresponding to the first line.

The DWT module may be further configured to generate second output data based on the first data corresponding to the first line stored in the buffer and the second data corresponding to the second line received from the conversion module, and the buffer may be further configured to delete the first data corresponding to the first line and store the second data corresponding to the second line after the DWT module generates the second output data.

The data converted by the conversion module may have a size of 1×N or N×1.

The conversion module may be further configured to perform the two-dimensional conversion to generate data having a size of N×N.

The DWT module may be further configured to generate output data having a size of 2N×2N based on the first output data and the second output data.

The conversion module may include: a first buffer configured to store the input image data; a first conversion module configured to convert the input image data by vertical lines; a second buffer configured to store data outputted from the first conversion module; and a second conversion module configured to convert the data stored in the second buffer by horizontal lines.

The second conversion module may be further configured to convert the image data converted by vertical lines in the first conversion module by horizontal lines to perform the two-dimensional conversion. The buffer may be further configured to, every time the data stored in the second buffer is converted by horizontal lines, receive the data converted by horizontal lines and store the received data.

The DWT module may be configured to perform DWT with respect to data corresponding to a first horizontal line received from the buffer, and the buffer may be further configured to store the data corresponding to the first horizontal line.

The DWT module may be configured to generate second output data based on the data corresponding to the first horizontal line stored in the buffer and data corresponding to a second line after the first horizontal line received from the conversion module. The buffer may be further configured to delete the data corresponding to the first line and store the data corresponding to the second horizontal line.

The data converted by horizontal lines may include data having a size of 1×N, where N is a natural number. The DWT module may be further configured to generate data having a size of 2N×2N based on the first output data and the second output data.

According to an aspect of an exemplary embodiment, there is provided an electronic apparatus, including: an image receiver configured to receive compressed image data; a decoder configured to convert the compressed image data by lines to perform two-dimensional conversion, and store line data generated every time the conversion by lines is performed; and a processor configured to perform DWT based on first data corresponding to a first line stored in the decoder and second data corresponding to a second line following the first line, the first line and the second line being generated by the conversion by lines via the decoder, and control the decoder to delete the first data corresponding to the stored first line and store the second data corresponding to the generated second line.

According to an aspect of an exemplary embodiment, there is provided a method of controlling a decoding apparatus, the method including: generating, by performing two-dimensional conversion by lines on input image data, first data corresponding to a first line; storing the first data in a buffer; generating, by performing the two-dimensional conversion by lines on the input image data, second data corresponding to a second line following the first line; in response to the second data being generated, performing DWT based on the first data received from the buffer and the second data, and in response to the performing DWT, deleting the first data from the buffer and storing the second data in the buffer.

The performing DWT may include generating first output data by performing DWT with respect to the first data corresponding to the first line.

The performing DWT may include generating second output data based on the first data corresponding to the first line stored in the buffer and the second data corresponding to the second line. The buffer may delete the first data and store the second data after the second output data is generated.

The data converted by lines may have a size of 1×N or N×1, where N is a natural number.

The performing two-dimensional conversion may include generating data having a size of N×N.

The performing DWT may include generating data having a size of 2N×2N based on the first output data and the second output data.

The performing two-dimensional conversion may include storing the input image data in a first buffer, converting the input image data by vertical lines to yield third data, storing the third data in a second buffer, and converting the third data stored in the second buffer by horizontal lines to yield the first data.

The storing the first data in the buffer may include, every time the third data stored in the second buffer is converted by horizontal lines, receiving the first data by the buffer and storing the first data in the buffer.

According to the various embodiments of the present disclosure, a size of a chip and costs may be reduced, thereby speeding up a calculating process.

BRIEF DESCRIPTION OF THE DRAWINGS

The above and other aspects of one or more exemplary embodiments will become more apparent by reference to specific embodiments thereof which are illustrated in the appended drawings. Understanding that these drawings depict only exemplary embodiments of the disclosure and are not therefore to be considered to be limiting of the scope of the disclosure, the principles herein are described and explained with additional specificity and detail through the use of the accompanying drawings, in which.

DETAILED DESCRIPTION

Hereinafter, exemplary embodiments will be described in more detail with reference to the accompanying drawings. In the following description, well-known functions or constructions are not described in detail because they would obscure the application with unnecessary detail. Among the terms used herein, those that are defined in the dictionaries may be interpreted based on the same or similar definitions that can be understood in the associated technical context, and unless specifically defined otherwise, these are not interpreted as ideal or unnecessarily formal ways. Therefore, the terms used in the exemplary embodiments should be defined based on the meaning thereof and the descriptions of the present disclosure, rather than based on their names only.

Figure 1:
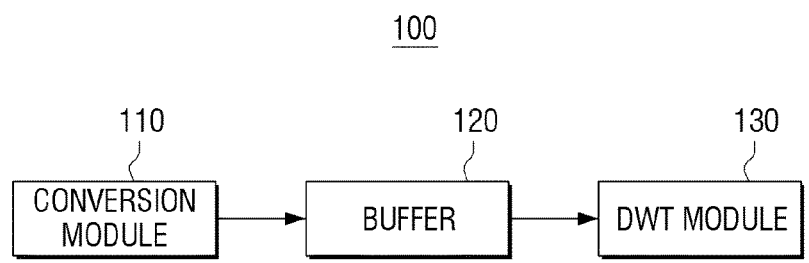
FIG. 1 is a block diagram illustrating a configuration of a decoding apparatus according to an exemplary embodiment.

FIG. 1 is a block diagram illustrating a configuration of a decoding apparatus according to an exemplary embodiment.

As shown in FIG. 1, a decoding apparatus 100 may include a conversion module 110, a buffer 120, and a discrete wavelet transform (DWT) module 130. In this example, the decoding apparatus 100 includes an apparatus for decoding input image data, and the DWT module 130 performs discrete wavelet transformation. Such wavelet transformation is already well known in the art, and thus, the details thereof will be omitted herein.

The conversion module 110 may convert input image data by lines to perform two-dimensional conversion. In other words, the input image data may be broken up into multiple horizontal and/or vertical lines and the image data may be converted one line at a time.

For example, the conversion module 110 may perform one-dimensional conversion by horizontal lines with respect to image data input by streaming, and perform one-dimensional conversion by vertical lines, to thereby perform two-dimensional conversion in which one-dimensional conversion is performed twice by horizontal lines and vertical lines.

In this example, the conversion module 110 may perform two-dimensional conversion with respect to the input image data to generate data having a size of N×N, where N is a natural number.

Further, every time a conversion by lines is performed in the conversion module 110, the buffer 120 may receive data converted by lines in real time and store the same. A buffer, such as the buffer 120 and others described in the present disclosure, may be a memory capable of storing data for temporary use. For instance, the buffer may be implemented with a random access memory (RAM), a flash memory, a register, a cache memory, etc.

For example, when the conversion module 110 sequentially converts data corresponding to a first horizontal line and a second horizontal line, the buffer 120 may receive and store the converted data corresponding to the first horizontal line, and then receive and store the converted data corresponding to the second horizontal line. The above process may be applied to the case where data is converted by vertical lines as well. This will be explained in detail below.

Further, the DWT module 130 may sequentially perform DWT based on the data corresponding to the first line received from the buffer 120 and the data corresponding to the second line after the first line received from the conversion module 110.

For example, the DWT module 130 may perform DWT based on the data corresponding to the first line, which is previously processed by performing two-dimensional conversion in the conversion module 110, and the data corresponding to the second line after the first line processed by performing two-dimensional conversion in the conversion module 110.

In this example, the data corresponding to each line may include data having a size of 1×N or data having a size of N×1.

For example, the DWT module 130 may perform DWT with respect to the data corresponding to the first line to generate first output data, and the buffer 120 may store the data corresponding to the first line.

That is, when the portion of data to which two-dimensional conversion is performed first from among input image data is data corresponding to the first line, the DWT module 130 may perform DWT with respect to the data corresponding to the first line to generate first output data. The reason is that the data to which two-dimensional conversion is previously performed is not currently stored in the buffer 120.

Further, the buffer 120 may store the data corresponding to the first line, while the DWT module 130 generates the first output data.

Subsequently, when the portion of data to which two-dimensional conversion is performed next from among the input image data is data corresponding to the second line, the DWT module 130 may generate second output data based on the data corresponding to the first line stored in the buffer 120 and the data corresponding to the second line received from the conversion module 110, and the buffer 120 may delete the data corresponding to the first line, and store the data corresponding to the second line.

That is, the buffer 120 may store the data corresponding to the first line to which two-dimensional conversion is previously performed. Accordingly, the DWT module 130 may perform DWT to the data corresponding to the first line pre-stored in the buffer 120 and the data corresponding to the second line to which two-dimensional conversion is performed in the current conversion module 110. Simultaneously, the buffer 120 may delete the pre-stored data corresponding to the first line, and store the data corresponding to the second line.

In the above example, the DWT module 130 may generate data having a size of 2N×2N based on the first output data and the second output data.

Figure 2:
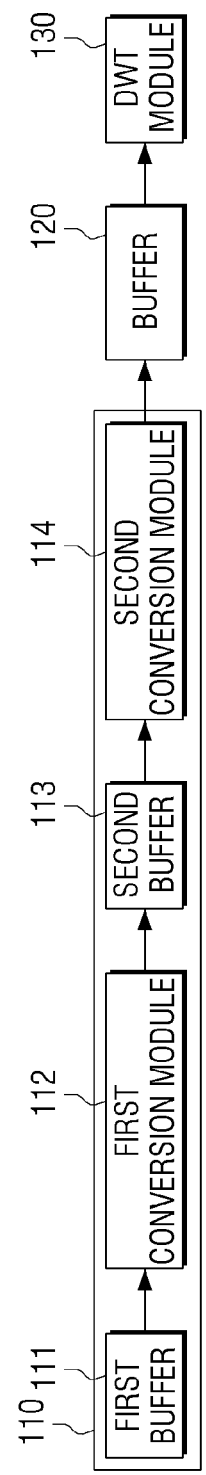
FIG. 2 is a block diagram illustrating a structure of a conversion module according to an exemplary embodiment.

FIG. 2 is a block diagram illustrating a structure of a conversion module according to an exemplary embodiment.

In FIG. 2, the conversion module 110 may include a first buffer 111, a first conversion module 112, a second buffer 113, and a second conversion module 114.

In this example, the first conversion module 112 may be a one-dimensional conversion module that converts input image data by vertical lines, and the second conversion module 114 may be a one-dimensional conversion module that converts input image data by horizontal lines. Alternatively, the first conversion module 112 may be a one-dimensional conversion module that converts input image data by horizontal lines, and the second conversion module 114 may be a one-dimensional conversion module that converts input image data by vertical lines. The case where the first conversion module 112 is a one-dimensional module that performs conversion by vertical lines, and the second conversion module 114 is a one-dimensional conversion module that performs conversion by horizontal lines will be described below.

Further, the first buffer 111 may store image data input from an external source. Further, the first conversion module 112 may perform one-dimensional conversion with respect to input image data stored in the first buffer 111 by vertical lines.

Further, the second buffer 113 may store data outputted from the first conversion module 112, and the second conversion module 114 may perform one-dimensional conversion with respect to the data stored in the second buffer 113 by horizontal lines.

In this example, the second conversion module 114 may convert, by horizontal lines, data to which one-dimensional conversion by vertical lines has already been performed by the first conversion module 112, resulting in the completion of two-dimensional conversion process. Each time the data stored in the second buffer 113 is converted by horizontal lines, the buffer 120 may receive data corresponding to the converted horizontal lines in real time and store the data.

That is, the second buffer 113 may store the results generated by performing one-dimensional conversion with respect to input data stored in the first buffer 111 by vertical lines by the first conversion module 112, and the second conversion module 114 may convert, by horizontal lines, the conversion results stored in the second buffer 113. In this example, the second conversion module 114 may, while performing conversion by horizontal lines, transmit the converted data corresponding to the horizontal line to the buffer 120 in real time. Accordingly, every time the data stored in the second buffer 113 is performed by horizontal lines, the buffer 120 may receive the converted data corresponding to the horizontal line in real time and store the data.

Further, the DWT module 130 may perform DWT with respect to the data corresponding to the first line received from the buffer 120 to generate first output data, and the buffer 120 may store the data corresponding to the first horizontal line.

That is, when the portion of data to which one-dimensional conversion is performed first from among data stored in the second buffer 113 is data corresponding to the first horizontal line, the DWT module 130 may perform DWT with respect to the data corresponding to the first horizontal line to generate first output data. The reason is that the data one-dimensionally converted by horizontal lines is not stored in the current buffer 120.

Further, the DWT module 130 may generate second output data based on the data corresponding to the first horizontal line stored in the buffer 120 and data corresponding to a second horizontal line after the first horizontal line received from the second conversion module 114, and the buffer 120 may delete the data corresponding to the first horizontal line and store the data corresponding to the second horizontal line.

That is, when the data to which one-dimensional conversion is performed next from among the data stored in the second buffer 113 is data corresponding to the second horizontal line, the DWT module 130 may generate second output data based on the data corresponding to the first horizontal line stored in the buffer 120 and the data corresponding to the second horizontal line received from the conversion module 114, and the buffer 120 may delete the data corresponding to the first horizontal line, and store the data corresponding to the second horizontal line.

That is, the buffer 120 may store the data corresponding to the first horizontal line to which one-dimensional conversion is performed by horizontal lines. Accordingly, the DWT module 130 may perform DWT based on the data corresponding to the first horizontal line previously stored in the buffer 120 and the data corresponding to the second line to which one-dimensional conversion is performed by horizontal lines in the second conversion module 114. Simultaneously, the buffer 120 may delete the previously stored data corresponding to the first horizontal line, and store the data corresponding to the second line.

In this example, the data converted by horizontal lines may include data having a size of 1×N (i.e., 1 horizontal line with N vertical lines each, or 1 row with N columns each), and the DWT module 130 may generate data having a size of 2N×2N based on the first output data and the second output data.

The first conversion module 112 may be a one-dimensional conversion module that converts input image data by horizontal lines, and the second conversion module 114 may be a one-dimensional conversion module that converts input image data by vertical lines. In this case, the above-described method may be applied in the same manner. In this example, data corresponding to a vertical line includes data having a size of N×1.

Figure 3:
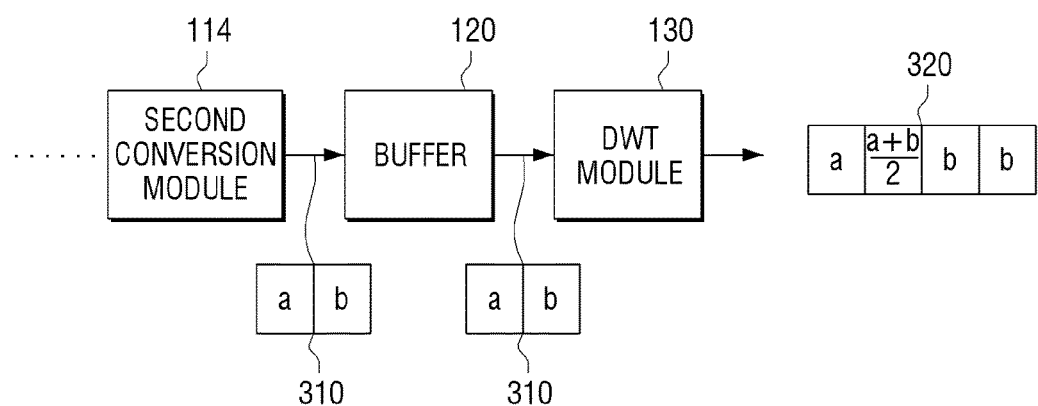
FIGS. 3-5 are block diagrams for describing methods of processing data, according to exemplary embodiments.
Figure 4:
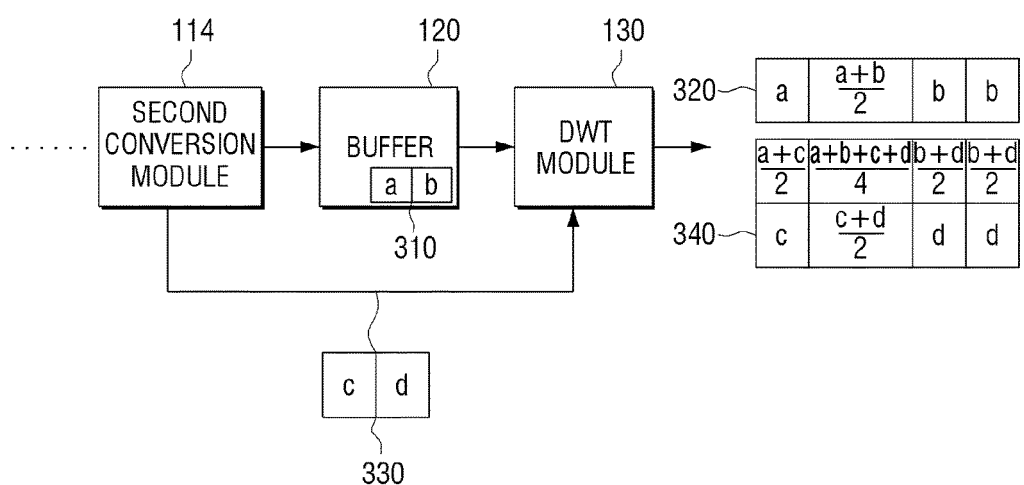
Figure 5:
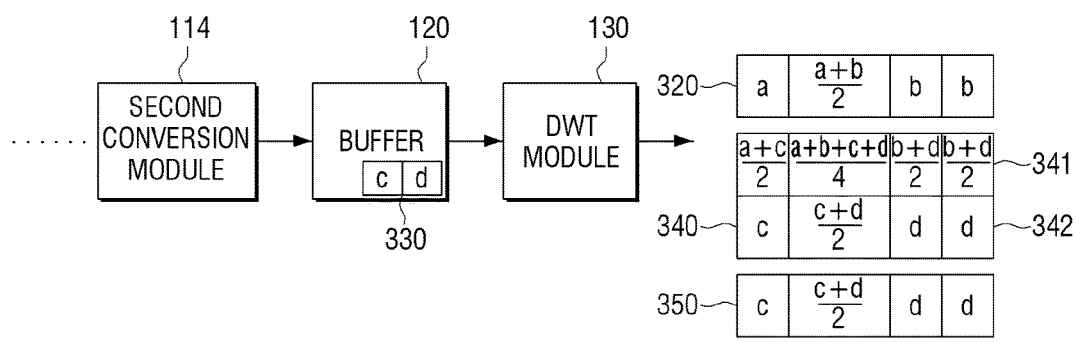

FIGS. 3-5 are block diagrams for describing methods for processing data, according to exemplary embodiments.

FIGS. 3-5 will be described under the assumption that output data having a size of 4×4 (i.e., 4 horizontal lines by 4 vertical lines) is generated from an output of two-dimensional conversion of a size of 2×2.

In FIG. 3, supposing that a result value of one-dimensional conversion by vertical lines by the first conversion module 112 is stored in the second buffer 113, the second conversion module 114 may perform one-dimensional conversion by horizontal lines with respect to the result value stored in the second buffer 113 to generate data (a, b) 310 corresponding to a first horizontal line, and the DWT module 130 may perform DWT with respect to the data (a, b) 310 corresponding to the first horizontal line to generate first output data (a, (a+b)/2, b, b) 320.

Simultaneously, the buffer 120 may store the data (a, b) 310 corresponding to the first horizontal line.

In FIG. 4, the second conversion module 114 may perform one-dimensional conversion by horizontal lines for the second time with respect to a result value, previously generated by performing one-dimensional conversion by vertical lines stored in the second buffer 113, to generate data (c, d) 330 corresponding to a second horizontal line. Also, the DWT module 130 may generate second output data, that is, ((a+c)/2, (a+b+c+d)/4, (b+d)/2, (b+d)/2), (c, (c+d)/2, d, d) based on the data (a, b) 310 corresponding to the first horizontal line stored in the buffer 120 and the data (c, d) 330 corresponding to the second horizontal line received from the second conversion module 114.

Simultaneously or in sequence, the buffer 120 may delete the data (a, b) 310 corresponding to the first horizontal line and store the data (c, d) 330 corresponding to the second horizontal line.

In this example, the first output data 320 first outputted by the DWT module 130 has a size of 1×4, and the second output data 340 outputted afterwards has a size of 2×4. That is, the DWT module 130 may generate a one-line first output data 320 the first time; however, subsequently, the DWT module 130 may generate a two-line second output data 340 based on the data 310 corresponding to the first horizontal line stored in the buffer 120 and the data 330 corresponding to the second horizontal line received from the second conversion module 114.

In FIG. 5, with respect to the last line from the output data having a size of 4×4, the DWT module 130 may, based on data 341 of the first line included in the second output data 340 and data 342 of the second line, generate a third output data (c, (c+d)/2, d, d) 350 having the same values as the data 342 of the second line.

Likewise, supposing that output data having a size of 16×16 is generated from an output of two-dimensional conversion having a size of 8×8, the DWT module 120 may generate a one-line first output data having a size of 1×16 the first time around; however, subsequently, it may generate a two-line second output data having a size of 2×16 based on the data corresponding to the first horizontal line stored in the buffer 120 and the data corresponding to the second horizontal line received from the second conversion module 114.

By repeating the above process, the DWT module 130 may generate a one-line first output data, a two-line second output data, a two-line third output data, and so on, which will result in output data having a size of 15×16.

Subsequently, with respect to the last line from among output data having a size of 16×16, the DWT module 130 may generate output data having the same values as output data positioned in the previous line (i.e., line 15) and dispose the same.

The above-described operation process may be applied in the same manner to the case where a result value generated by performing one-dimensional conversion by horizontal lines by the first conversion module 112 is stored in the second buffer 113, and the second conversion module 114 performs one-dimensional conversion by vertical lines with respect to the result value stored in the second buffer 113.

Figure 6:
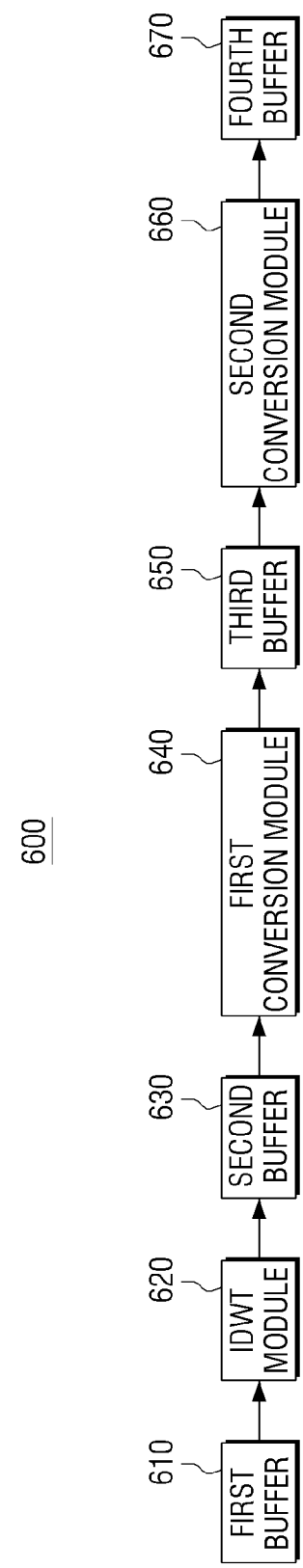
FIG. 6 is a block diagram illustrating a configuration of an encoding apparatus according to an exemplary embodiment.

FIG. 6 is a block diagram illustrating a configuration of an encoding apparatus according to an exemplary embodiment.

In FIG. 6, the encoding apparatus 600 may include a first buffer 610, an inverse discrete wavelet transform (IDWT) module 620, a second buffer 630, a first conversion module 640, a third buffer 650, a second conversion module 660, and a fourth buffer 670.

The first buffer 610 may include upscaled image data having a size of 2N×2N, and the IDWT module 620 may, each time an inverse DWT is performed by horizontal lines or by vertical lines with respect to data having a size of 2N×2N, transmit data corresponding to a line to which IDWT is performed to the second buffer 630 and the first conversion module 640 in real time.

For example, the IDWT module 620 may perform IDWT by horizontal lines first with respect to data having a size of 2N×2N, and thereby data corresponding to a first horizontal line is transmitted to the first conversion module 640 for one-dimensional conversion. Simultaneously, the data corresponding to the first horizontal line may be stored in the second buffer 630.

Further, the IDWT module 620 may perform IDWT by horizontal lines for the second time with respect to data having a size of 2N×2N and data corresponding to the second horizontal line is transmitted to the first conversion module 640. The first conversion module 640 may perform one-dimensional conversion with respect to the data corresponding to the first horizontal line stored in the second buffer 630 and the data corresponding to the second horizontal line received from the IDWT module 620.

Figure 7:
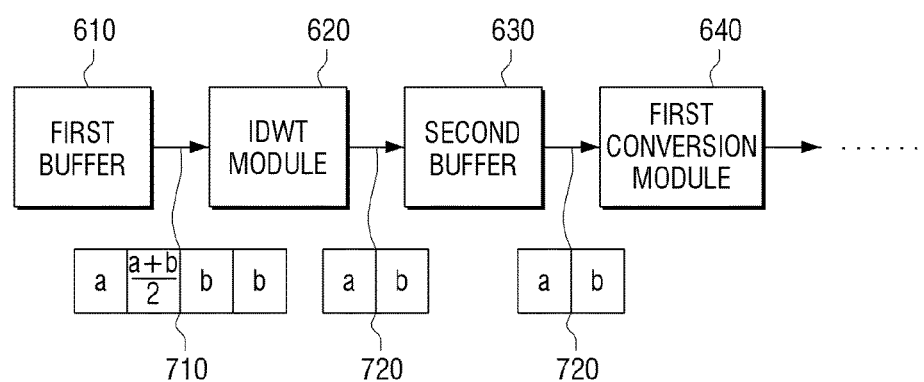
FIGS. 7-8 are block diagrams illustrating an encoding process according to exemplary embodiments.
Figure 8:
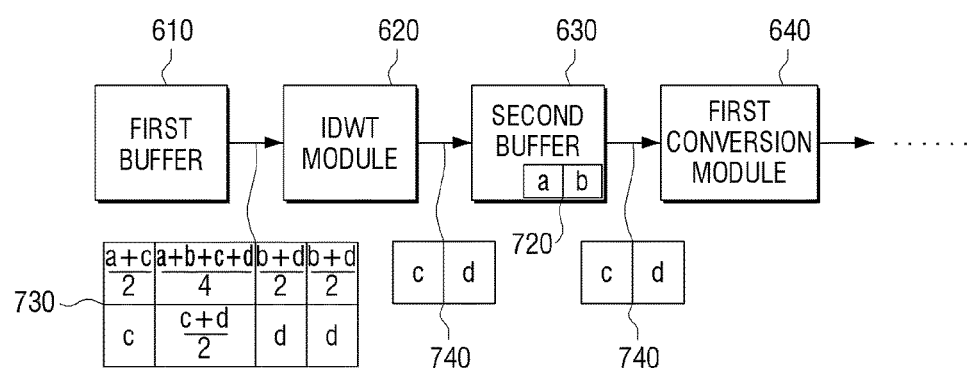

FIGS. 7-8 are block diagrams illustrating an encoding process according to exemplary embodiments.

FIGS. 7-8 relate to converting example data having a size of 4×4 into data having a size of 2×2.

In FIG. 7, when IDWT is performed with respect to first data (a, (a+b)/2, b, b) 710, which corresponds to the first line of the data having a size of 4×4 stored in the first buffer 610, via the IDWT module 620, data (a, b) 720 corresponding to a first line may be generated, and the data (a, b) corresponding to the first horizontal line may be stored in the second buffer 630. Further, the data (a, b) 720 corresponding to the first horizontal line may be transmitted to the first conversion module 640, and undergo one-dimensional conversion.

In FIG. 8, when second data ((a+c)/2, (a+b+c+d)/4, (b+d)/2, (b+d)/2) and third data (c, (c+d)/2, d, d) 730 corresponding to the second and third lines, respectively, of the data having a size of 4×4 stored in the first buffer 610 are transmitted to the IDWT module 620, the IDWT module 620 may perform IDWT with respect to data (a, b) 720 corresponding to the first horizontal line stored in the second buffer 630, the second data ((a+c)/2, (a+b+c+d)/4, (b+d)/2, (b+d)/2) received from the first buffer 610 and the third data (c, (c+d)/2, d, d) 730 to generate data (c, d) 740 corresponding to a second horizontal line.

The generated data (c, d) 740 corresponding to the second horizontal line may be transmitted to the first conversion module 640 to undergo one-dimensional conversion. Around the same time, the data (c, d) 740 corresponding to the second horizontal line may be stored in the second buffer 630.

By repeating the above-described process, 4×4 data is converted into 2×2 data.

Another example regarding an encoding process will be described. For example, a conventional encoder to encode 4×4 data to 2×2 data may convert the 4×4 data, such as ((a, b, c, d); (e, f, g, h); (i, j, k, l); (m, n, o, p)), to 2×2 data, such as ((A, B); (C, D)). In this example, it may be such that A=(a+b+e+f)/4, B=(c+d+g+h)/4, C=(i+j+m+n)/4, D=(k+l+o+p)/4.

Further, image data may be obtained by performing 2×2 two-dimensional conversion with respect to ((A, B); (C, D)) obtained through the encoder. For this purpose, a buffer having a size of 2×2, that is, a buffer for storing ((A, B); (C, D)), is required.

Compared with the above, an encoder using an encoding scheme to perform an inverse process of the decoding scheme according to an embodiment of the present disclosure does not wait until all of ((A, B); (C, D)) are obtained as with a conventional encoder, but performs one-dimensional conversion as soon as data of (A, B) is obtained and subsequently perform one-dimensional conversion again as soon as the encoder obtains data of (C, D), and thereby image data is obtained.

Therefore, the encoder using an encoding scheme to perform an inverse process of the decoding scheme according to an embodiment of the present disclosure includes a buffer having a size of 2×1, instead of a buffer having a size of 2×2 as with a conventional encoder, and may perform the same function as the conventional encoder with a smaller-sized buffer.

Figure 9:
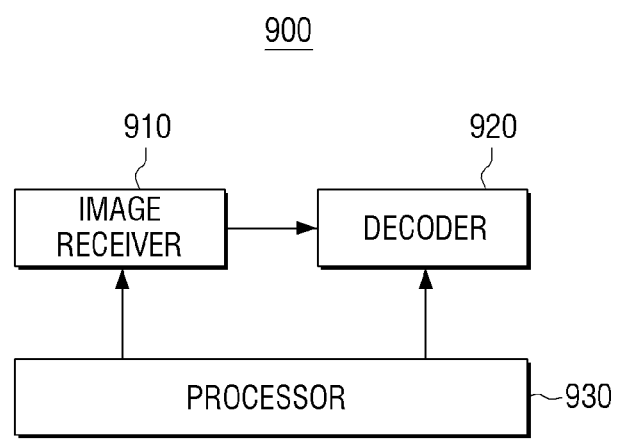
FIG. 9 is a block diagram illustrating a structure of an electronic apparatus according to an exemplary embodiment.

FIG. 9 is a block diagram illustrating a structure of an electronic apparatus according to an exemplary embodiment.

The electronic apparatus 900 may include an image receiver 910, a decoder 920, and a processor 930.

In this example, the electronic apparatus 900 may be any apparatus capable of performing image processing (e.g., a TV, an electronic whiteboard, an electronic table, a large format display (LFD), a smartphone, a tablet computing device, a desktop personal computer (PC), a notebook computer, a set-top box, etc.).

Further, the image receiver 910 may receive compressed image data.

Further, the decoder 920 may convert the compressed image data by lines to perform two-dimensional conversion, and store the generated line data every time the conversion by lines is performed. That is, the decoder 920 may correspond to the decoding apparatus 100 described in FIGS. 1-5, and the operation process of the conversion module 110, the buffer 120, and the DWT module 130 included in the decoding apparatus 100 described in FIGS. 1-5 may be applied to the decoder 920 in the same manner.

Further, the processor 930 may perform DWT based on data corresponding to a first line stored in the decoder 920 and data corresponding to a second line after the first line generated according to conversion by lines, and control the decoder 920 to delete the stored data corresponding to the first line and store the generated data corresponding to the second line.

With respect to an operation of controlling the decoder 920 by the processor 930, the operation process of the conversion module 110, the buffer 120 and DWT module 130 included in the decoder 110 described in FIGS. 1-5 may apply in the same manner, and thus, the detailed description will be omitted herein.

Figure 10:
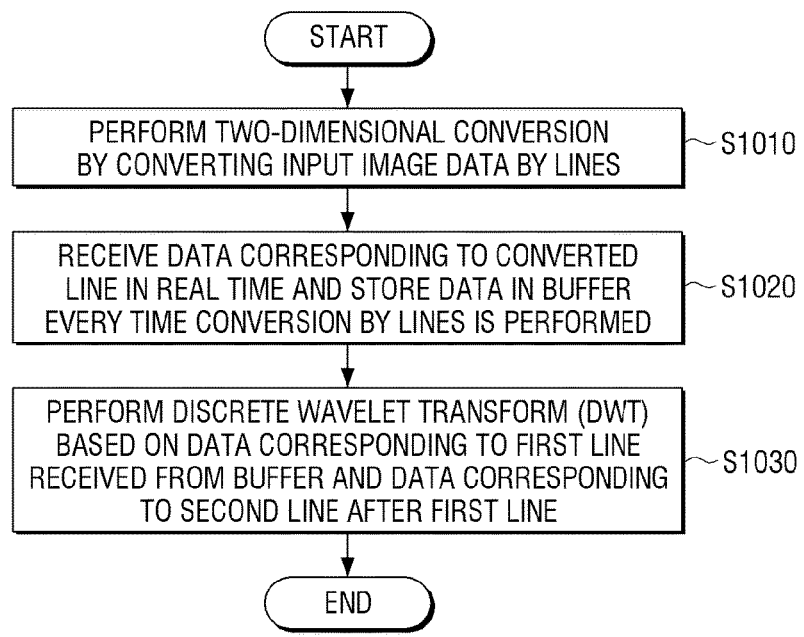
FIG. 10 is a flowchart illustrating a control method of a decoding apparatus according to an exemplary embodiment.

FIG. 10 is a flowchart illustrating a control method of a decoding apparatus according to an exemplary embodiment.

The controlling method of the decoding apparatus illustrated in FIG. 10 includes performing two-dimensional conversion by converting input image data by lines, at operation S1010.

Then, every time the conversion by lines is performed, data corresponding to a converted line is received in real time and stored in a buffer, at operation S1020.

Then, DWT is performed based on data corresponding to a first line received from the buffer and data corresponding to a second line after the first line, at operation S1030.

In this example, the buffer may, in response to receiving new data, delete previously stored data and store new data.

Performing DWT may include generating first output data by performing DWT with respect to data corresponding to the first line, and storing the received data in the buffer may include storing the data corresponding to the first line.

The performance of DWT may include generating second output data based on the data corresponding to the first line stored in the buffer and the data corresponding to the second line after the first line, and the storage of the received data in the buffer may include deleting the data corresponding to the first line and storing the data corresponding to the second line.

The data corresponding to a line may have a size of 1×N or a size of N×1.

Performing two-dimensional conversion may include performing the two-dimensional conversion to generate data having a size of N×N.

The performing DWT may include generating data having a size of 2N×2N based on the first output data and the second output data.

The performance of two-dimensional conversion may include storing the input image data in a first buffer, converting the input image data by vertical lines, storing the data converted by vertical lines in a second buffer, and converting the data stored in the second buffer by horizontal lines.

The conversion of the data stored in the second buffer by horizontal lines may include converting the image data converted by vertical lines by horizontal lines to perform the two-dimensional conversion, and the storage of the received data in the buffer may include, every time the data stored in the second buffer being converted by horizontal lines, receiving the data converted by horizontal lines in real time and storing the received data.

A non-transitory computer readable medium in which a program performing the various methods described above are stored may be provided according to an exemplary embodiment.

For example, a non-transitory computer readable medium in which a program including performing two-dimensional conversion by converting input image data by lines, receiving data corresponding to a converted line and storing the data in a buffer every time conversion by lines is performed, and performing DWT based on data corresponding to a first line received from the buffer and data corresponding to a second line after the first line are stored may be provided.

The non-transitory computer readable medium is not a medium that stores data therein for a short while, such as a register, a cache, a memory, or the like, but refers to a medium that at least semi-permanently stores data therein and is readable by a device such as a microprocessor. In detail, various applications or programs described above may be stored and provided in the non-transitory computer readable medium such as a compact disc (CD), a digital versatile disc (DVD), a hard disk, a solid-state drive (SSD), a Blu-ray disc, a universal serial bus (USB) memory, a memory card, a read-only memory (ROM), or the like.

However, these embodiments do not limit the present disclosure to only a particular type of encoding and decoding, but instead, the disclosure may be applied to different types of encoding and decoding with necessary modifications. These modifications should also be understood to fall within the scope of the present disclosure.

What is claimed is:

1. A decoding apparatus, comprising:
    a conversion module configured to convert input image data by lines to perform two-dimensional conversion by:
        generating first data corresponding to a first line of the input image data, and
        generating second data corresponding to a second line that follows the first line in the input image data, wherein the first line and the second line are oriented in a same direction;
    a buffer configured to, based on the first data being generated in the conversion module, receive and store the first data corresponding to the first line; and
    a discrete wavelet transform (DWT) module configured to, based on the second data being generated in the conversion module:
        receive, from the buffer, the first data corresponding to the first line,
        receive, from the conversion module, the second data corresponding to the second line, and
        perform DWT based on the first data and the second data,
    wherein the buffer is further configured to, based on receiving the second data from the conversion module, delete the first data and store the second data,
    wherein the DWT module is configured to perform DWT with respect to data corresponding to a first horizontal line received from the buffer to generate first output data,
    wherein the buffer is further configured to store the data corresponding to the first horizontal line,
    wherein the DWT module is configured to generate second output data based on the data corresponding to the first horizontal line stored in the buffer and data corresponding to a second horizontal line after the first horizontal line received from the conversion module, and
    wherein the buffer is further configured to delete the data corresponding to the first horizontal line and store the data corresponding to the second horizontal line.

2. The decoding apparatus as claimed in claim 1, wherein the DWT module is configured to perform DWT with respect to the first data corresponding to the first line to generate first output data while the buffer stores the first data corresponding to the first line.

3. The decoding apparatus as claimed in claim 2, wherein the DWT module is further configured to generate second output data based on the first data corresponding to the first line stored in the buffer and the second data corresponding to the second line received from the conversion module, and
    wherein the buffer is further configured to delete the first data corresponding to the first line and store the second data corresponding to the second line after the DWT module generates the second output data.

4. The decoding apparatus as claimed in claim 3, wherein data converted by the conversion module has a size of one of 1×N and N×1, the N being a natural number.

5. The decoding apparatus as claimed in claim 4, wherein the conversion module is further configured to perform the two-dimensional conversion to generate data having a size of N×N.

6. The decoding apparatus as claimed in claim 4, wherein the DWT module is further configured to generate output data having a size of 2N×2N based on the first output data and the second output data.

7. The decoding apparatus as claimed in claim 1, wherein the conversion module comprises:
    a first buffer configured to store the input image data;
    a first conversion module configured to convert the input image data by vertical lines;
    a second buffer configured to store data outputted from the first conversion module; and
    a second conversion module configured to convert the data stored in the second buffer by horizontal lines.

8. The decoding apparatus as claimed in claim 7, wherein the second conversion module is further configured to convert the input image data converted by vertical lines in the first conversion module by horizontal lines to perform the two-dimensional conversion, and
    wherein the buffer is further configured to, every time the data stored in the second buffer is converted by horizontal lines, receive the data converted by horizontal lines and store the received data.

9. The decoding apparatus as claimed in claim 8, wherein the data converted by horizontal lines includes data having a size of 1×N, the N being a natural number, and
    wherein the DWT module is further configured to generate data having a size of 2N×2N based on the first output data and the second output data.

10. An electronic apparatus, comprising:
    an image receiver configured to receive compressed image data;
    a decoder configured to convert the compressed image data by lines to perform two-dimensional conversion, and store line data generated every time the two-dimensional conversion by lines is performed; and
    a processor configured to:

perform discrete wavelet transform (DWT) based on first data corresponding to a first line of the compressed image data stored in the decoder and second data corresponding to a second line following the first line in the compressed image data, wherein the first line and the second line are oriented in a same direction and generated by the two-dimensional conversion by lines via the decoder, control the decoder to delete the first data corresponding to the stored first line and store the second data corresponding to the generated second line, perform DWT with respect to data corresponding to a first horizontal line stored in the decoder to generate first output data, control the decoder to store the data corresponding to the first horizontal line, generate second output data based on the data corresponding to the first horizontal line stored in the decoder and data corresponding to a second horizontal line after the first horizontal line received from the decoder, and control the decoder to delete the data corresponding to the first horizontal line and store the data corresponding to the second horizontal line.

11. A method comprising:

generating, by performing two-dimensional conversion by lines on input image data, first data corresponding to a first line of the input image data;

based on the first data being generated, storing the first data in a buffer;

generating, by performing the two-dimensional conversion by lines on the input image data, second data corresponding to a second line following the first line in the input image data, wherein the first line and the second line are oriented in a same direction;

based on the second data being generated, performing discrete wavelet transform (DWT) based on the first data received from the buffer and the second data; and based on the performing DWT, deleting the first data from the buffer and storing the second data in the buffer, performing DWT with respect to data corresponding to a first horizontal line received from the buffer to generate first output data, storing the data corresponding to the first horizontal line in the buffer, generating second output data based on the data corresponding to the first horizontal line stored in the buffer and data corresponding to a second horizontal line after the first horizontal line received from the buffer, and deleting the data corresponding to the first horizontal line from the buffer and storing the data corresponding to the second horizontal line in the buffer.

12. The method as claimed in claim 11, wherein the performing DWT comprises generating first output data by performing DWT with respect to the first data corresponding to the first line.

13. The method as claimed in claim 12, wherein the performing DWT comprises generating second output data based on the first data corresponding to the first line stored in the buffer and the second data corresponding to the second line, and wherein the buffer deletes the first data and stores the second data after the second output data is generated.

14. The method as claimed in claim 13, wherein data converted by lines has a size of one of 1×N and N×1, the N being a natural number.

15. The method as claimed in claim 14, wherein the performing two-dimensional conversion comprises generating data having a size of N×N.

16. The method as claimed in claim 15, wherein the performing DWT comprises generating data having a size of 2N×2N based on the first output data and the second output data.

17. The method as claimed in claim 11, wherein the performing two-dimensional conversion comprises:

storing the input image data in a first buffer;

converting the input image data by vertical lines to yield third data;

storing the third data in a second buffer; and converting the third data stored in the second buffer by horizontal lines to yield the first data.

18. The method as claimed in claim 17, wherein the storing the first data in the buffer comprises, every time the third data stored in the second buffer is converted by horizontal lines, receiving the first data by the buffer and storing the first data in the buffer.

* * * * *